(12) United States Patent
Kuroda et al.

(10) Patent No.: US 7,104,133 B2
(45) Date of Patent: Sep. 12, 2006

(54) TORSIONAL VIBRATION MEASURING INSTRUMENT

(75) Inventors: Hidehiko Kuroda, Kanagawa-ken (JP); Shigeru Kanemoto, Kanagawa-ken (JP); Michio Sato, Kanagawa-ken (JP); Kiyoto Oyagi, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/509,126

(22) PCT Filed: Mar. 28, 2003

(86) PCT No.: PCT/JP03/03979

§ 371 (c)(1),
(2), (4) Date: Nov. 29, 2004

(87) PCT Pub. No.: WO03/083416

PCT Pub. Date: Oct. 9, 2003

(65) Prior Publication Data

US 2005/0092092 A1 May 5, 2005

(30) Foreign Application Priority Data

Mar. 28, 2002 (JP) .............................. 2002-090296

(51) Int. Cl.
*G01N 29/00* (2006.01)
*G01B 9/02* (2006.01)
(52) U.S. Cl. ..................... 73/650; 73/657; 73/862.324; 456/455
(58) Field of Classification Search .................. 73/650, 73/652, 655, 657, 660, 800, 862.324, 762, 73/847; 356/450, 455, 349, 350

See application file for complete search history.

(56) References Cited

U.S. PATENT DOCUMENTS

| | | | |
|---|---|---|---|
| 4,347,748 A | 9/1982 | Pierson | |
| 4,352,295 A | 10/1982 | Maehara et al. | |
| 4,601,580 A * | 7/1986 | Halliwell | 356/459 |
| 4,862,749 A | 9/1989 | Yagi | |
| 4,918,997 A | 4/1990 | Pouillang | |
| 5,001,937 A | 3/1991 | Bechtel et al. | |
| 5,253,531 A * | 10/1993 | Walker et al. | 73/650 |

(Continued)

FOREIGN PATENT DOCUMENTS

CA 1121174 A 4/1982

(Continued)

*Primary Examiner*—Hezron Williams
*Assistant Examiner*—Jacques Saint-Surin
(74) *Attorney, Agent, or Firm*—Foley & Lardner LLP

(57) ABSTRACT

A torsional vibration measuring instrument has a plurality of reflecting means (6, 7) arranged with stipulated intervals along surface of a rotator (5) of which torsional vibration is to be measured; a pulse light irradiating means (1, 2) for irradiating a repetitive pulse light beam to the reflecting means; and an outgoing-transmitting means (3, 4) for transmitting the irradiated pulse light beam. The torsional vibration measuring instrument also has a plurality of transmitting-receiving means (8, 9) for irradiating the transmitted pulse light beam to the reflecting means, and for receiving reflected pulse light beams which have been reflected by the reflecting means; and an incoming-transmitting means (3, 4) for transmitting the reflected pulse light beams which have been received. The torsional vibration measuring instrument also has a plurality of detecting means (12, 13) for detecting the reflected pulse light beams which have been transmitted by the incoming-transmitting means; and a signal processing means (14) for processing pulse output signals which have been outputted from the detecting means and for calculating torsional vibration frequency of the rotator to be measured.

18 Claims, 8 Drawing Sheets

U.S. PATENT DOCUMENTS

| | | | |
|---|---|---|---|
| 5,297,044 A | | 3/1994 | Sakaki et al. |
| 5,438,882 A | | 8/1995 | Karim-Panahi et al. |
| 5,474,813 A | | 12/1995 | Walker et al. |
| 5,723,794 A | | 3/1998 | Discenzo |
| 5,734,108 A | | 3/1998 | Walker et al. |
| 5,747,699 A | | 5/1998 | Ebi |
| 6,158,286 A | * | 12/2000 | Nguyen et al. ............... 73/660 |
| 6,253,620 B1 | * | 7/2001 | Yamashita ................... 73/650 |
| 6,426,497 B1 | * | 7/2002 | Martinez et al. ....... 250/231.14 |
| 6,460,422 B1 | | 10/2002 | Kuroda et al. |
| 6,751,281 B1 | * | 6/2004 | Hikida et al. ............... 376/372 |
| 6,925,879 B1 | * | 8/2005 | Raichle ....................... 73/579 |

FOREIGN PATENT DOCUMENTS

| | | |
|---|---|---|
| DE | 30 11 700 A1 | 10/1980 |
| DE | 44 25 503 C1 | 7/1995 |
| EP | 0 284 087 A2 | 9/1988 |
| EP | 0 285 827 B1 | 10/1988 |
| EP | 0 608 993 A2 | 8/1994 |
| EP | 0 771 413 B1 | 5/1997 |
| EP | 0 795 123 B1 | 8/2001 |
| FR | 2 612 633 A1 | 9/1988 |
| GB | 2 049 169 A | 12/1980 |
| JP | 52-142557 A | 11/1977 |
| JP | 52-142568 A | 11/1977 |
| JP | 55-131738 A | 10/1980 |
| JP | 4-348239 A | 12/1992 |
| JP | 7-3360 B | 1/1995 |
| JP | 7-5056 A | 1/1995 |
| JP | 7-509053 A | 10/1995 |
| JP | 2000-205977 A | 7/2000 |
| JP | 2002-22564 A | 1/2002 |
| WO | WO 91/06840 A1 | 5/1991 |
| WO | WO 93/21502 A1 | 10/1993 |
| WO | WO 95/11431 A1 | 4/1995 |
| WO | WO 96/02815 A1 | 2/1996 |
| WO | WO 97/12214 A1 | 4/1997 |

* cited by examiner

TORSIONAL VIBRATION MEASURING INSTRUMENT

TECHNICAL FIELD

The present invention is related to a torsional vibration measuring instrument for measuring torsional vibration of a rotator, such as a rotational machine or a vehicle, with high precision and without contact.

BACKGROUND ART

A prior-art technique of measuring torsional vibration of a rotator is disclosed in Japanese Patent Application Publication Tokkai Hei-7-5056 and U.S. Pat. No. 5,438,882, for example. This system includes a pair of optical detectors with convergence lenses, a controller for converting the output of the optical detectors into digital data, an oscilloscope for displaying the output wave shapes of the optical detectors, a computer for analyzing the digital data, a display device for displaying the analyzed results and reflective mark bands attached on the rotator.

The reflective mark bands are wound around the rotator to be measured. The reflective mark bands have a plurality of lines or marks parallel to the axial direction, which are arranged along the peripheral direction with equal pitches "d". The lines and the marks are reflective, and the other portion of the mark bands is non-reflective. Each of the pair of optical detectors with the convergence lenses are aligned with corresponding reflective mark bands of the pair of reflective mark bands.

In operation of this prior-art system, when a rotator of radius of R which is rotating with an angular velocity of $\Omega$, the light reflected on the reflective mark band is converged by the convergence lenses and detected by the optical detectors. As a result, pulse signals with time intervals of $\tau=d/(R\Omega)$ are detected by the oscilloscope which displays the output wave shape of the optical detectors.

When there is no torsional vibration, the phase difference of the pulse signals is constant. On the other hand, when there is a torsional vibration, the phase difference of the pulse signals is not constant, and the phase difference vibrates. The pulse signals are digitized in order to determine the fluctuation of the phase difference. Then, the fluctuation of the phase difference is determined by digital analysis using a computer. The torsional vibration frequency is derived from the fluctuation of the phase difference, and the torsional vibration frequency is shown on the display device.

In the prior-art system described above, when the rotator to be measured has axial vibration or non-torsional vibration, the rising and dropping times and the signal amplitude of the pulse signal change due to the axial vibration. Therefore, idealistic pulse signals can hardly be obtained, and then, torsional vibration and rotational speed cannot be accurately measured.

The present invention is to solve the problem described above. An object of the present invention is to present a torsional vibration measuring instrument which can measure torsional vibration of a rotator with high precision even when the rotational axis of the rotator to be measured has an axial vibration.

DISCLOSURE OF INVENTION

In order to achieve the above-mentioned object, a torsional vibration measuring instrument according to the present invention comprises a torsional vibration measuring instrument comprising: a plurality of reflecting means arranged with stipulated intervals therebetween along surface of a rotator of which torsional vibration is to be measured; a pulse light irradiating means for irradiating a repetitive pulse light beam to the plurality of reflecting means; an outgoing-transmitting means for transmitting the irradiated pulse light beam; a plurality of transmitting-receiving means for irradiating the transmitted pulse light beam to the plurality of reflecting means, and for receiving plurality of reflected pulse light beams which have been reflected by the plurality of reflecting means; an incoming-transmitting means for transmitting the plurality of reflected pulse light beams which have been received; a plurality of detecting means for detecting the plurality of reflected pulse light beams which have been transmitted by the incoming-transmitting means; and a signal processing means for processing a plurality of pulse output signals which have been outputted from the plurality of detecting means and for calculating torsional vibration frequency of the rotator to be measured.

BEST MODE FOR CARRYING OUT THE INVENTION

Figure 1:
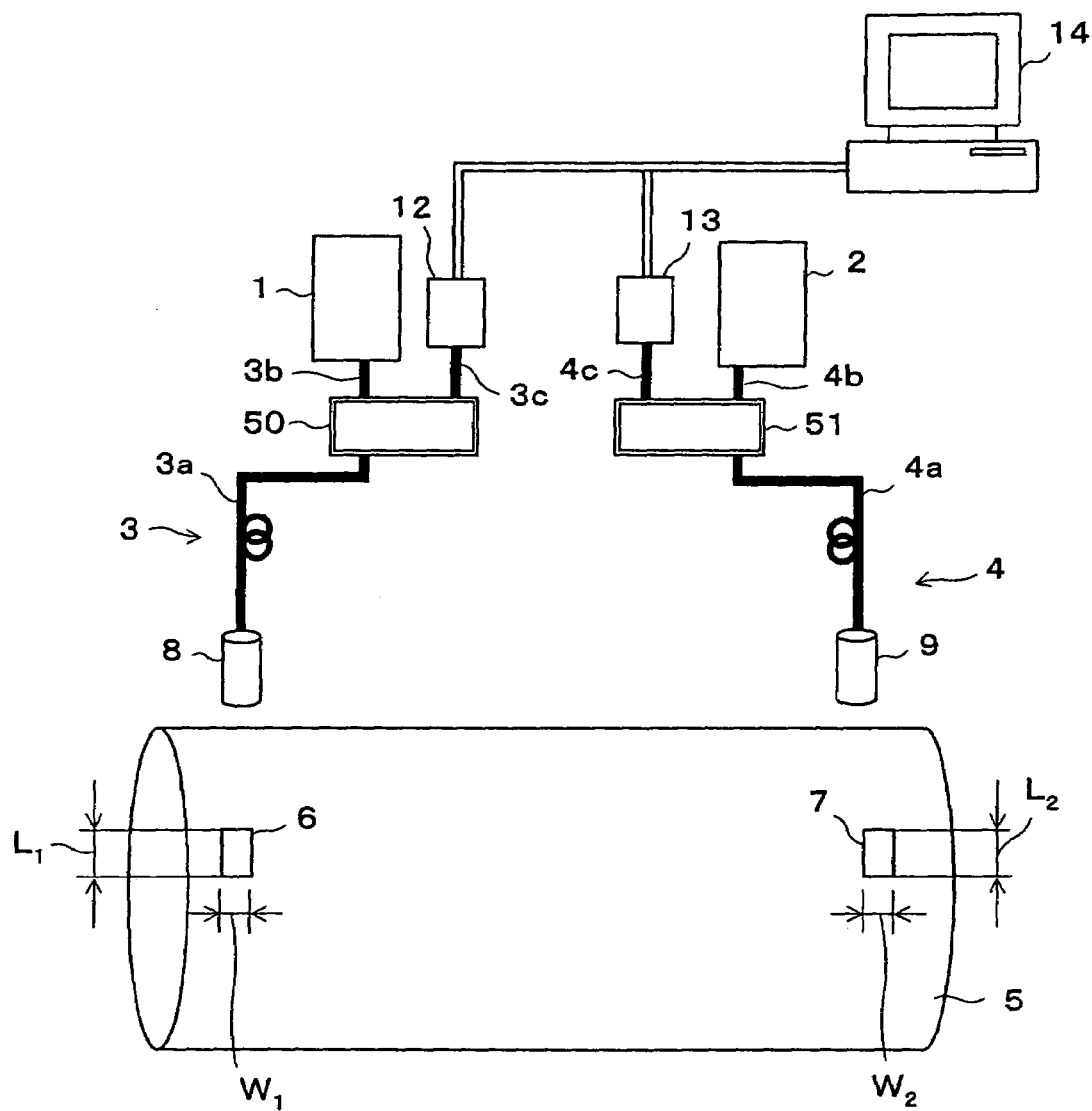
FIG. 1 is a schematic diagram showing a construction of a first embodiment of a torsional vibration measuring instrument according to the present invention.

Now, an embodiment of the present invention is described referring to the drawings.

FIG. 1 is a diagram showing a construction of a first embodiment of a torsional vibration measuring instrument according to the present invention. As shown in FIG. 1, the torsional vibration measuring instrument of this embodiment includes a first pulse light irradiation device 1 and a second pulse light irradiation device 2 for irradiating first and second pulse light beams, respectively. The torsional vibration measuring instrument also has a first transmission device 3 and a second transmission device 4 for transmitting the first and second pulse light beams, respectively.

First reflector plate 6 and a second reflector plate 7, which reflect the pulse light beams, are attached on the rotator 5 to be measured. The torsional vibration measuring instrument also has a first transmitting-receiving device 8 and a second transmitting-receiving device 9, which irradiate the first and second transmitted pulse light beams to the first reflector plate 6 and a second reflector plate 7, and receive the first and the second reflected pulse light beams, respectively.

The torsional vibration measuring instrument also has first detectors 12 and a second detector 13 for detecting the first and second reflected pulse light beams transmitted by the first transmission device 3 and the second transmission device 4, respectively. The torsional vibration measuring instrument also has a signal processor 14 for processing the first and second pulse output signals and calculating the frequency etc. of torsional vibration of the rotator 5 to be measured.

The first pulse light irradiators 1 and the second pulse light irradiator 2 have pulse light sources which are adjustable in pulse repetition frequency fp [Hz] and in pulse time width wp [s]. The first pulse light irradiators 1 and the second pulse light irradiator 2 may be a laser such as a semi-conductor laser, other types of pulse lasers, light-emitting diodes (LEDs) and flash lamps.

The first transmission device 3 and the second transmission device 4 may have optical fibers and lens elements. The lens elements are used to enhance the combining efficiency at the connections with the first pulse light irradiators 1 and the second pulse light irradiator 2. The lens elements may include spherical lenses, non-spherical lenses, laminated lenses, combination lenses, distributed-refraction-factor lenses or ball lenses.

As shown in FIG. 1, the first and second pulse light beams irradiated from first pulse light irradiators 1 and the second pulse light irradiator 2, respectively, are guided through the optical fibers 3b and 4b via the first and second light beam splitters 50 and 51, respectively, to the first and second transmitting-receiving devices 8 and 9, respectively. When the pulse light beams irradiated from the first transmitting-receiving device 8 and the second transmitting-receiving device 9 hit the first reflector plate 6 and the second reflector plate 7, respectively, the beams reflect back to the first transmitting-receiving device 8 and the second transmitting-receiving device 9, respectively. The reflected pulse light beams returned to the first transmitting-receiving device 8 and the second transmitting-receiving device 9 go back to the first light beam splitter 50 and the second light beam splitter 51 via the optical fibers 3a and 4a, respectively. The pulse light beams returned to the first light beam splitter 50 and the second light beam splitter 51 are divided there, and at least part of the light beams are guided to the first detector 12 and the second detector 13 through the optical fibers 3c and 4c, respectively.

Figure 2:
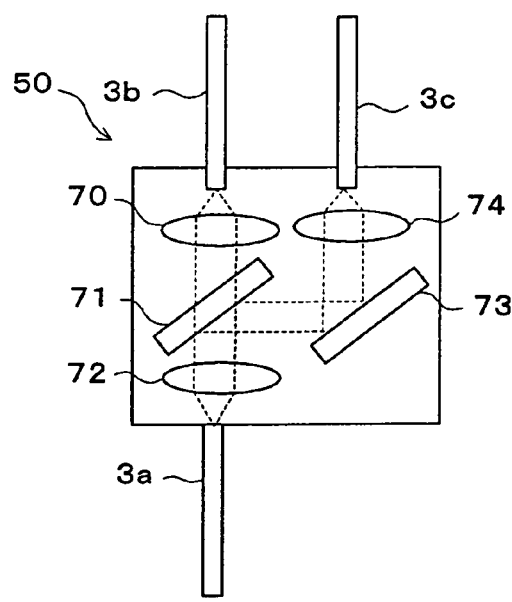
FIG. 2 is a detailed diagram showing a construction of an example of the first light-beam splitter shown in FIG. 1.

The first light beam splitter 50 is constructed as shown in FIG. 2, for example. The pulse light beam incident from the optical fiber 3b passes through a first lens 70, a semi-transparent reflector plate 71, and then, a second lens 72. Then, the light beam goes out through the optical fiber 3a. On the other hand, the reflected pulse light beam incident through the optical fiber 3a goes through the second lens 72, and then, is reflected at the semi-transparent reflector plate 71. Then, the beam is reflected at a reflector plate 73, goes through a third lens 74, and then, goes out through an optical fiber 3c. The second light beam splitter 51 is constructed similarly.

The first transmission device 3 and the second transmission device 4 may be alternatively formed with mirrors etc. where the pulse light beams are transmitted through empty space instead of optical fibers.

Referring to FIG. 1 again, the first reflector plate 6 and the second reflector plate 7 have reflection areas where the first and second pulse light beams are regularly reflected with high efficiency, respectively. The reflection areas are aligned outwardly in radial directions along the periphery of the rotator 5 to be measured.

The first transmitting-receiving device 8 and the second transmitting-receiving device 9 are aligned, so that they can irradiate pulse light beams perpendicular to the revolution axis of the rotator 5 to be measured and perpendicular to the first reflector plate 6 and the second reflector plate 7, respectively.

The axial lengths $W_1$ [m] and $W_2$ [m], the peripheral lengths $L_1$ [m] and $L_2$ [m] of the first reflector plate 6 and the second reflector plate 7, respectively, are dimensioned to satisfy the following formulas (1) and (2), wherein there is no limit in thickness:

$$W_1 > Va > \Phi, W_2 > Va > \Phi \quad (1)$$

$$L_1 >> Vr >> \Phi, L_2 >> Vr >> \Phi \quad (2)$$

wherein Va [m] is an axial vibration amplitude of the rotator 5 to be measured, Vr [m] is a vibration amplitude of the rotator 5 to be measured in peripheral direction (and perpendicular to the direction of the first and second pulse light beams), and $\Phi$ [m] is the beam diameter of the first and second pulse light beams on the surface of the rotator 5 to be measured.

The first transmitting-receiving device 8 and the second transmitting-receiving device 9 have lens elements similar to the lens elements described above, so that the first and second pulse light beams become parallel, converged or diverged to make the beam diameter $\Phi$ [m] on the surface of the rotator 5 to be measured. Thus, the first and second reflected pulse light beams from the first reflector plate 6 and the second reflector plate 7, respectively, are efficiently combined with the first transmission device 3 and the second transmission device 4, respectively.

The first detector 12 and the second detector 13 may have various types of photoelectric converting elements such as photo diodes, photoelectric tubes and photo multipliers. The first and second reflected pulse light beams transmitted by the first transmission device 3 and the second transmission device 4, respectively, are converged by lens elements similar to the lens elements described above, and are incident to the first detector 12 and the second detector 13, respectively.

A signal processing unit 14 has an analogue-to-digital converter and a computer. The signal processing unit 14 converts the analogue electric signal outputs from the first detector 12 and the second detector 13, and processes the signals to obtain the torsional vibration. The signal processing unit 14 may include dedicated analogue or digital circuits.

Now, the operation of the first embodiment of the torsional vibration measuring instrument is described. The first pulse light beam irradiated from the first pulse light irradiation device 1 is transmitted to the first transmitting-receiving device 8 via the optical fiber 3b of the first transmission device 3, the first light splitter 50 and the optical fiber 3a. The first transmitting-receiving device 8 irradiates the first pulse light beam to the first reflector plate 6 of the rotator 5 to be measured so that the beam diameter Φ [m] satisfies Formulas (1) and (2). The second pulse light beam is irradiated in the same way as the first pulse light beam.

If the rotator 5 to be measured with axial vibration rotates at a rotational speed of fm [Hz], the first reflection pulse light beam is generated only when the first pulse light beam is irradiated on the reflecting area. On the other hand, the axial vibration of the rotator 5 to be measured can be decomposed into three components which are (a) in axial direction of the rotator 5 to be measured, (b) in the same direction as the first pulse light beam which is irradiated by the first transmitting-receiving device 8, and (c) in the peripheral direction of the rotator 5 to be measured (or perpendicular to the direction of the first pulse light beam). The first reflected pulse light beam is not affected by the vibration of the rotator 5 to be measured in axial direction under the condition of Formula (1). Furthermore, since the first pulse light beam is a parallel light or extremely small in diameter, focal depth is large, and the vibration in the direction of the first pulse light beam of the rotator 5 to be measured does not affect.

The first reflected pulse light beam is transmitted from the first transmitting-receiving device 8 to the first detector 12 via the optical fiber 3a of the first transmission device 3 for receiving, the first light beam splitter 50 and the optical fiber 3c. The first detector 12 detects the first reflected pulse light beam and converts it into electricity. The second reflected pulse light beam is treated likewise.

Figure 3:
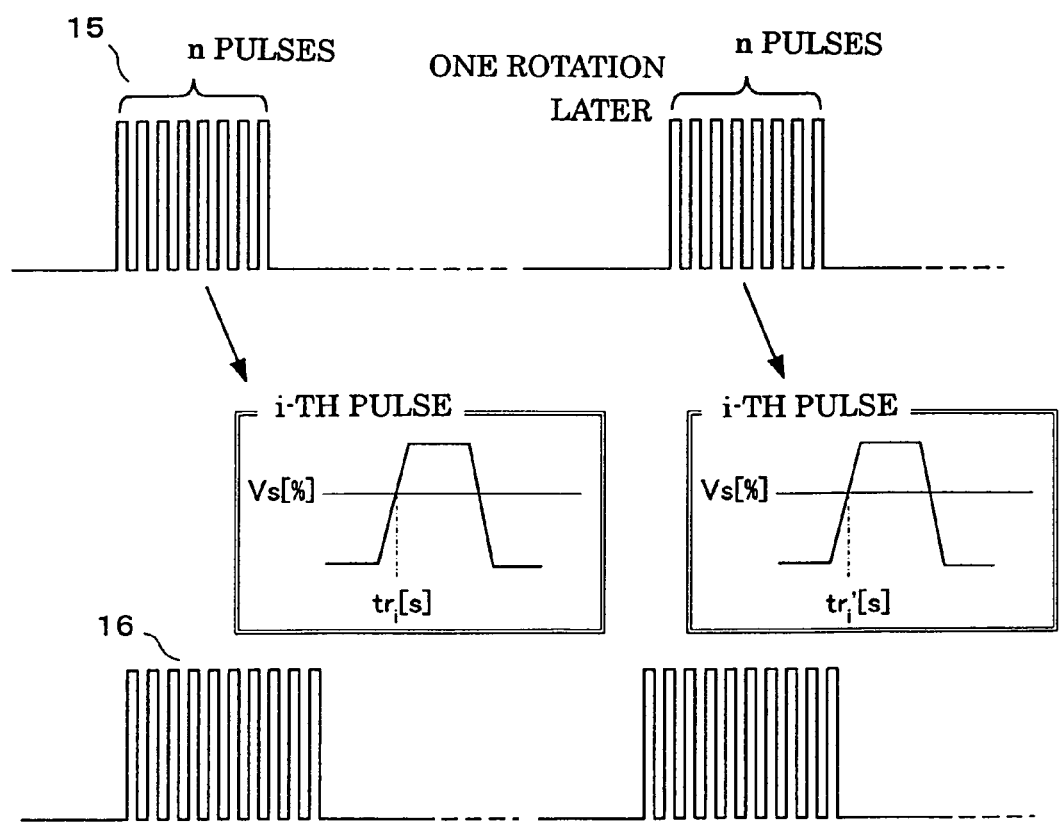
FIG. 3 is a chart showing the first and second pulse output signals of the first embodiment of the torsional vibration measuring instrument.

As shown in FIG. 3, one first pulse output signal 15 consisting of n pulses is output in every rotation of the rotator 5 to be measured. Here, "n" is a number of pulse lights (n≧2) which are irradiated to one of the reflector plates 6 or 7 and are reflected there during the period the particular one of the reflector plates 6 or 7 passes in front of the transmitting-receiving devices 8 or 9. In this case, the vibration in axial direction and in the direction of the first pulse light beam, of the rotator 5 to be measured, would not affect, as discussed above. Furthermore, the rising and dropping times of the first pulse output signal 15 are the rising and dropping times of the first pulse light beam, since Formula (2) is satisfied.

On the other hand, the rising and dropping times of the second pulse output signal 16 are the rising and dropping times of the second pulse light beam.

The first pulse output signal 15 and the second pulse output signal 16 are converted from analogue signals to digital signals, and then, they are input to the signal processing unit 14. In the signal processing unit 14, a threshold value Vs [%] (1≦Vs≦100) of relative reference pulse amplitude level is set for the i-th pulse (1≦i≦n) in the first pulse output signal 15 at the pulse rising, as shown in FIG. 3. Then, the trigger time $tr_i$ [s] of the i-th pulse is measured.

Likewise, the trigger time $tr_i'$ [s] of the i-th pulse after one revolution is measured using the relative level Vs [%]. The trigger times $tr_i$ [s] and $tr_i'$ [s] for all pulses in the first pulse output signal 15 are measured. Then, the rotational period $T_1$ [s] of the first pulse output signal 15 is derived by averaging through the element pulses, as shown in Formula (3):

$$T_1 = \Sigma (tr_i' - tr_i)/n \quad (3)$$

Thus, the measurement accuracy of the rotational period $T_1$ [s] is enhanced by averaging through the n element pulses.

Likewise, the rotational period $T_2$ [s] of the second pulse output signal 16 is derived. Then, the time difference $T_t$ between the two rotational periods $T_1$ and $T_2$ by Formula (4) shown below is sequentially derived. The torsional vibration frequency $f_t$ [Hz] is derived from the frequency analysis of the time difference $T_t$. The two rotational periods $T_1$ [s] and $T_2$ [s] are affected by the vibration in the peripheral direction of the rotator 5 to be measured. However, the effect of the rotator would be canceled and eliminated because the two rotational periods $T_1$ [s] and $T_2$ [s] are equally affected.

$$T_t = |T_1 - T_2| \quad (4)$$

The first pulse output signal 15 and the second pulse output signal 16 are not affected by the vibrations of the rotator 5 to be measured, in axial direction, in peripheral direction or in the direction of the first and second pulse light beam irradiation. As a result, even when the axis of the rotator 5 to be measured vibrates, the torsional vibration frequency $f_t$ [Hz] can be precisely obtained. That is through measuring the rotational periods $T_1$ [s] and $T_2$ [s], and then, obtaining the time difference $T_t$ of the rotational periods by Formula (4), and analyzing the frequency.

Figure 4:
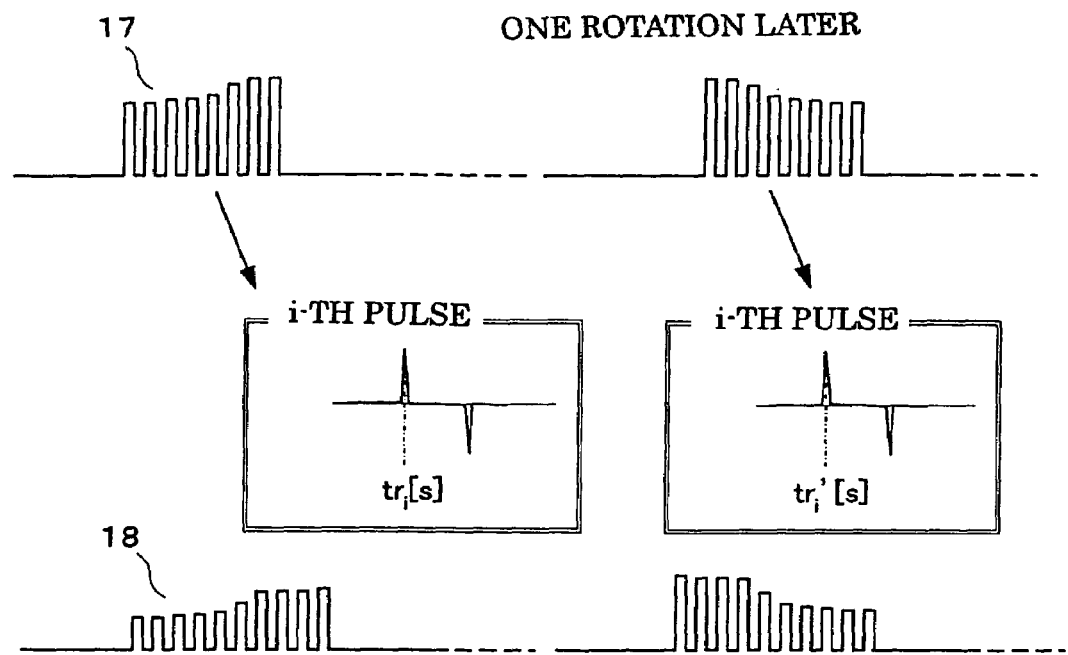
FIG. 4 is a chart showing the first and second pulse output signals of the first embodiment of the torsional vibration measuring instrument when the pulse amplitudes are unstable.

Now, another operation of the first embodiment of the torsional vibration measuring instrument is described referring to FIG. 4. When the first detector 12 and the second detectors 13 are noisy, the pulse vibration amplitudes of the first pulse output signal 17 and the second pulse output signal 18 may be unstable and may change as shown in FIG. 4.

In this case, the trigger time measurement in the signal processing unit 14 is not conducted by the method discussed above referring to FIG. 3. In this case, the rising pulse of the i-th pulse in the n pulses (1≦i≦n) constituting the first pulse output signal 17 is differentiated and the time of the maximum value is set to be the trigger time $tr_i$ [s] of the i-th pulse. Likewise, the i-th pulse after one rotation is differentiated and the trigger time $tr_i'$ [s] is obtained. The trigger times $tr_i$ [s] and $tr_i'$ [s] are measured for all pulses constituting the first pulse output signal 17. Then, the first rotational period $T_1$ [s] of the first pulse output signal 17 is obtained by averaging over the constituting pulses using Formula (3). Likewise, the second rotational period $T_2$ [s] of the second pulse output signal 18 is obtained. Then, the torsional vibration frequency $f_t$ [Hz] is obtained.

Thus, the trigger times $tr_i$ [s] and $tr_i'$ [s] of the pulse elements constituting the first pulse output signal 17 and the second pulse output signal 18, even when the amplitudes of pulse elements constituting the first pulse output signal 17 and the second pulse output signal 18 are unstable and changing. Then, the torsional vibration frequency $f_t$ [Hz] can be obtained with high accuracy.

Figure 5:
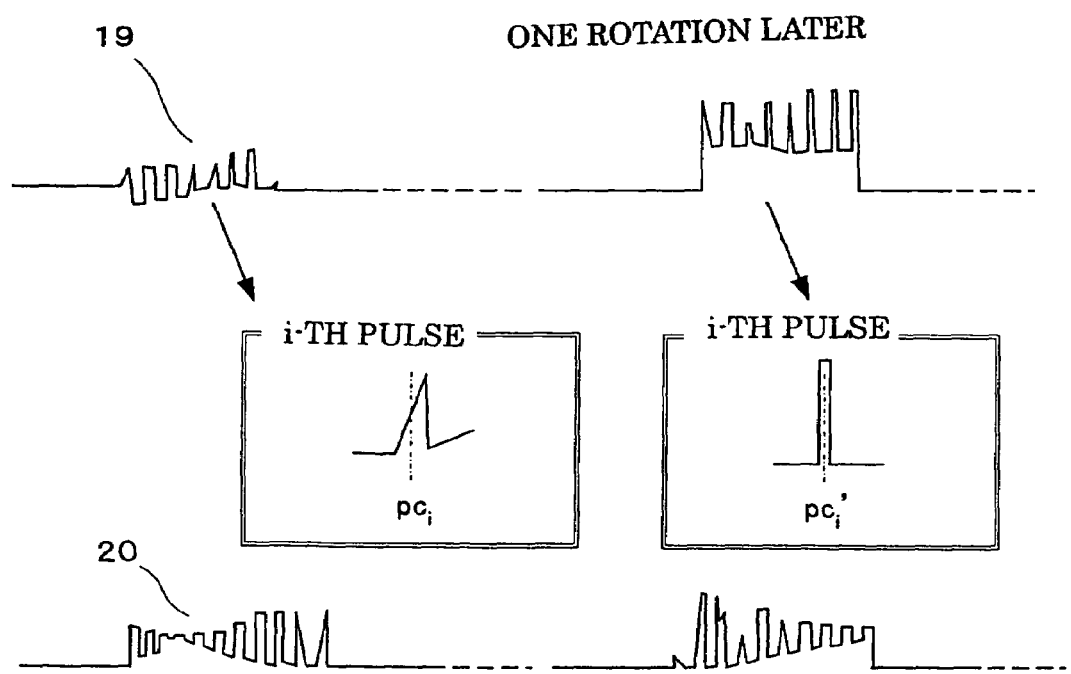
FIG. 5 is a chart showing the first and second pulse output signals of the first embodiment of the torsional vibration measuring instrument when the pulse shapes and the pulse amplitudes are unstable.

Now, yet another operation of the first embodiment of the torsional vibration measuring instrument is described referring to FIG. 5. When the first detector 12 and the second detector 13 are further noisy, the first pulse output signal 19 and the second pulse output signal 20 may be unstable and may change in the pulse shapes and in the pulse amplitudes, as shown in FIG. 5.

In this case, the trigger time measurement in the signal processing unit 14 is not conducted by the methods discussed above referring to FIG. 3 or 4. In this case, the pulse count $pc_i$ of the first pulse light irradiation device 1 at the time when the i-th pulse (1≦i≦n), which constitutes the first pulse output signal 19, is detected. A pulse count is the number of pulses counted from an arbitrary reference time. A pulse is distinguished when a high-level or low-level output has been maintained for a pre-determined time period or when accumulated value of the output has reached a pre-determined value, for example.

Next, the pulse count $pc_i'$ is measured at the time when the i-th pulse is detected after one rotation. Then, the pulse counts $pc_i$ and $pc_i'$ are measured for all the pulses which constitute the first pulse output signal 19. Then, the rotational period $T_1$ [s] of the first pulse output signal 19 is obtained by averaging over the constituting pulses using Formula (5).

$$T_1 = \Sigma(pc_i' - pc_i)/fp^2/n \tag{5}$$

Likewise, the rotational period $T_2$ [s] of the second pulse output signal 20 is derived. Then, the torsional vibration frequency $f_t$ [Hz] is obtained.

Thus, even when the pulse shapes and pulse amplitudes of the pulse elements constituting the first pulse signal 19 and the second pulse signals 20 are unstable and are changing, the rotational periods $T_1$ [s] and $T_2$ [s] of the first pulse signal 19 and the second pulse signal 20, respectively, can be obtained by counting the pulses. Then, the torsional vibration frequency $f_t$ [Hz] can be precisely determined.

Now, yet another operation of the first embodiment of the torsional vibration measuring instrument is described. If the first detector 12 and the second detector 13 are further noisy, for example, the first pulse signal 19 and the second pulse signal 20 become unstable and change in pulse shapes and in pulse amplitude. In addition, noises may be generated even outside of the reflection regions. Then, measurement of the first pulse signal 19 and the second pulse signal 20 after one rotation may become difficult, due to the noses outside of the reflection regions.

In such a case, for the trigger time measurement in the signal processing unit 14, the pulse time interval $(tr_n - tr_1)$ [s] or counted pulse numbers $(pc_n - pc_1)$ of the first and n-th pulses in the n pulses constituting the first pulse output signal 19 is measured. Then, the rotational period $T_1$ [s] of the first pulse output signal 19 is obtained by calculating Formula (6) shown below, using the peripheral length $L_1$ [m] of the first reflector plate 6.

$$\begin{aligned}T_1 &= (2\pi R/L_1)(tr_n - tr_1) \\ &= (2\pi R/L_1)(pc_n - pc_1)/fp^2\end{aligned} \tag{6}$$

where fp is the pulse repetition frequency [Hz] of the first pulse light beam, and R is rotational radius [m] of the rotator 5 to be measured.

Likewise, the rotation period $T_2$ [s] of the second pulse output signal 20 and the torsional vibration frequency $f_t$ [Hz] are derived.

As described above, the rotation periods $T_1$ [s] and $T_2$ [s] of the first pulse output signal 19 and the second pulse output signal 20, respectively, are derived, undisturbed by noises generated outside of the reflection region, even when the shapes and the amplitudes of the pulses constituting the first pulse output signal 19 and the second pulse output signal 20 are unstable and change, or even when noises are generated outside of the reflection region. Then, the torsional vibration frequency $f_t$ [Hz] can be precisely measured.

Now, yet another operation of the first embodiment of the torsional vibration measuring instrument is described. In a case, noises are added on the first pulse output signal 15 and the second pulse output signal 16, and preciseness in measuring the rotation periods $T_1$ [s] and $T_2$ [s] may deteriorate.

In this case, the pulse repetition frequency fp [Hz] in the first pulse light irradiation device 1 and the second pulse light irradiation device 2 is set higher. And the pulse time interval wp [s] is set shorter if required. As a result, the first pulse output signal 15 and the second pulse output signal 16, each of which consists of n' pulse elements (n'>n), are collected in the signal processing unit 14.

In the signal processing unit 14, the rotation periods $T_1$ [s] and $T_2$ [s] of the first and the second pulse output signals are obtained based upon Formulas (3), (5) or (6). At that time, the rotation periods are calculated by averaging n' pulse elements, the number of which is larger than the number of the constituting pulse elements or n. Therefore, measurement accuracy of the rotational periods is secured. As a result, the torsional vibration frequency $f_t$ [Hz] can be obtained precisely.

As described above, the number n of the pulse elements which constitute the first and second pulse output signals each can be increased, by enhancing the repetition frequency fp [Hz] of the first pulse light irradiation device 1 and the second pulse light irradiation device 2. Thus, the rotation periods $T_1$ [s] and $T_2$ [s] of the first pulse output signal 15 and the second pulse output signal 26, respectively, can be obtained without deteriorating measurement preciseness, based upon Formulas (3), (5) or (6). Then, the torsional vibration frequency $f_t$ [Hz] of the rotator 5 to be measured can be precisely obtained.

Figure 6:
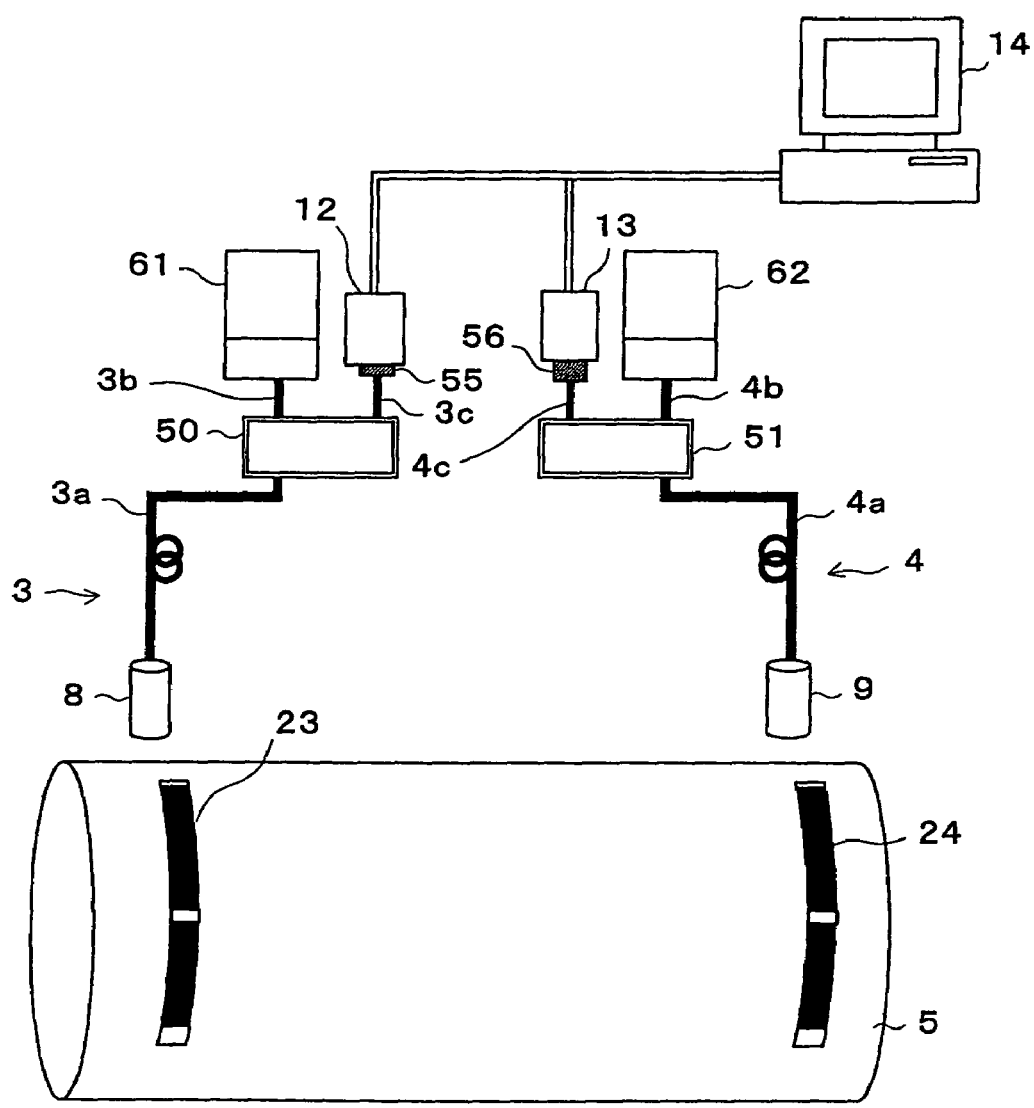
FIG. 6 is a schematic diagram showing a construction of a second embodiment of a torsional vibration measuring instrument according to the present invention.
Figure 7:
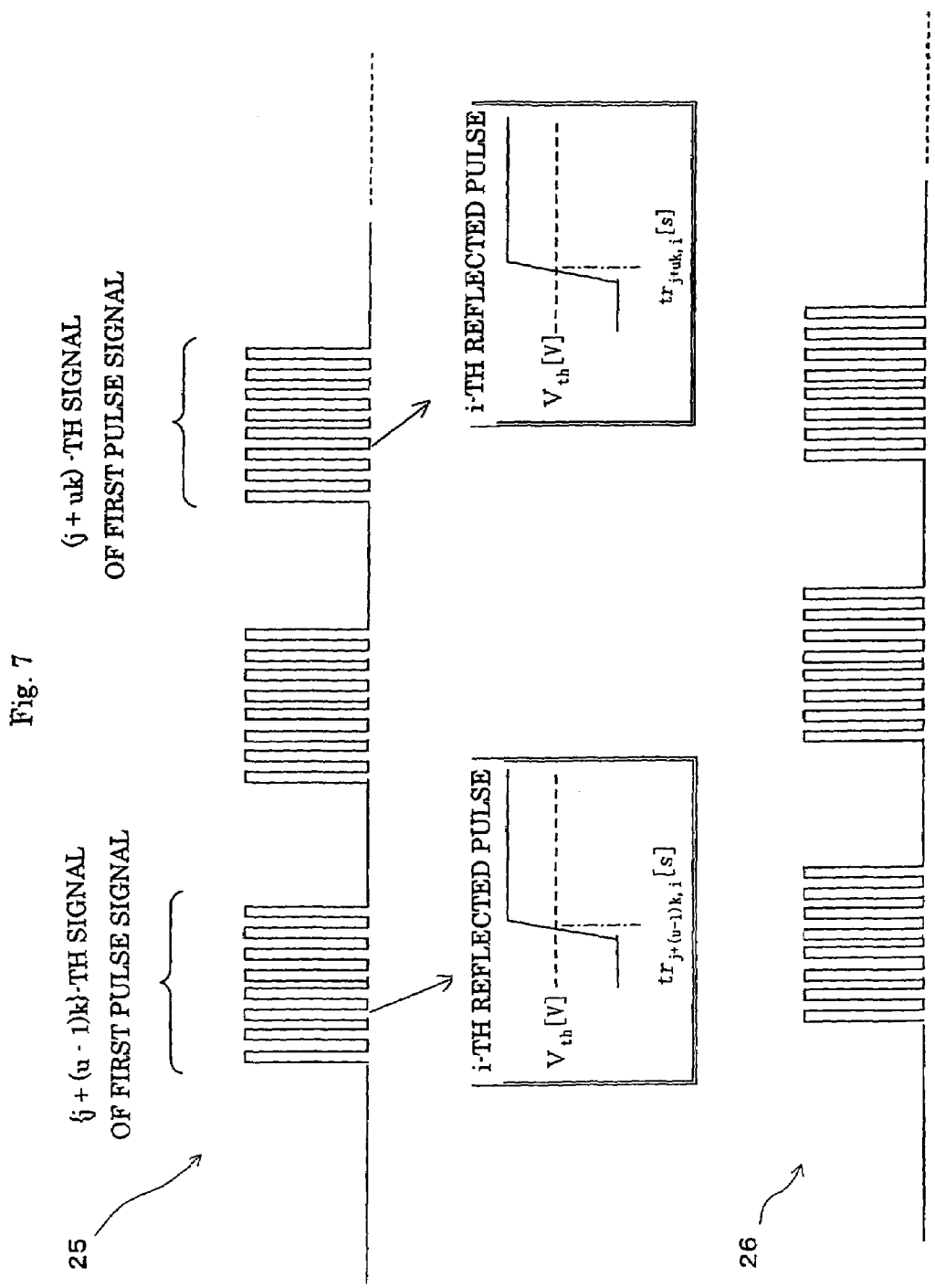
FIG. 7 is a chart showing the first and second pulse output signals of the second embodiment of the torsional vibration measuring instrument.

Now a second embodiment of the torsional vibration measuring instrument according to the present invention is described referring to FIGS. 6 and 7. Here, parts that are common to those in the first embodiment are given common symbols and repetitive description is eliminated.

As shown in FIG. 6, the torsional vibration measuring instrument of this embodiment includes a first pulse light irradiation device 61 and a second pulse light irradiation device 62 for irradiating first and second pulse light beams, respectively. The torsional vibration measuring instrument also has a first transmission device 3 and a second transmission device 4 for transmitting the first and second pulse light beams, respectively. A first multiplex reflector plate 23 and a second multiplex reflector plate 24, which reflect light beams, are attached on the rotator 5 to be measured. The torsional vibration measuring instrument also has a first transmitting-receiving device 8 and a second transmitting-receiving device 9. The first and transmitting-receiving devices 8 and 9 irradiate the first and second transmitted pulse light beams to the first multiplex reflector plate 23 and the second multiplex reflector plate 24, respectively, and receive the first and second reflected pulse light beam reflected by the first multiplex reflector plate 23 and the second multiplex reflector plate 24, respectively.

The torsional vibration measuring instrument also has a first transmission device 3 and a second transmission device 4 which transmit the first and second reflected pulse light beams, and a first light beam splitter 50 and a second light beam splitter 51 which split the first and second reflected pulse light beams from the first and second pulse light beams, respectively. The torsional vibration measuring instrument also has a first wavelength selecting element 55 and a second wavelength selecting element 56, which select the first and second reflected pulse light beams that have been separated by the first light beam splitter 50 and the second light beam splitter 51, by wavelengths. The torsional vibration measuring instrument also has a first light detector 12 and a second light detector 13, which detect the first and second reflected pulse light beams that have been selected by wavelengths. The torsional vibration measuring instrument also has a signal processing unit 14, which processes the first and second pulse output signals that are output by the first light detector 12 and the second light detector 13.

The first pulse light irradiation device 61 and the second pulse light irradiation device 62 have light sources which can irradiate light beams with variable wavelengths. Such light sources may be wavelength-variable lasers of liquid, solid or semi-conductors etc., lasers utilizing non-linear optical crystals, LEDs or lamps utilizing wavelength-variable elements, for example. The light sources may be formed by a plurality of lasers, LEDs or lamps with different oscillatory wavelengths.

The first and second pulse light beams irradiated from the first pulse light irradiation device 61 and the second pulse light irradiation device 62 are guided to the first transmitting-receiving device 8 and the second transmitting-receiving device 9 through the optical fibers 3b and 4b, via the first light splitter 50 and the second light splitter 51, and through the optical fibers 3a and 4a, respectively.

When the pulse light beams irradiated from the first transmitting-receiving device 8 and the second transmitting-receiving device 9 hit the first multiplex reflector plate 23 and the second multiplex reflector plate 24, the pulse light beams are reflected and return to the first transmitting-receiving device 8 and the second transmitting-receiving device 9, respectively. The reflected pulse light beams, which have returned to the first transmitting-receiving device 8 and the second transmitting-receiving device 9, return to the first light splitter 50 and the second light splitter 51 through the optical fibers 3a and 3b, respectively, again. The pulse light beams which have returned to the first light splitter 50 and the second light splitter 51 are separated there, and at least part of the light is guided to the first detector 12 and the second detector 13 through the optical fibers 3c and 4c, respectively.

The first multiplex reflector plate 23 and the second multiplex reflector plate 24 each have m reflector regions where the first and second pulse light beams are reflected efficiently and less reflective regions which isolate the reflector regions. The less reflective regions are constructed to absorb or scatter the first and second pulse light beams.

The axial lengths $W_1$ [m] and $W_2$ [m], the peripheral lengths $L_1$ [m] and $L_2$ [m] of the first multiplex reflector plate 23 and the second multiplex reflector plate 24, respectively, are dimensioned to satisfy Formulas (1) and (2). The intervals between the reflector regions may or may not be uniform. The number of the reflector regions is not limited.

The first wavelength selecting element 55 and the second wavelength selecting element 56 may be optical filters, diffraction elements or prisms, for example.

Now, operation of the second embodiment of the torsional vibration measuring instrument is described referring to FIG. 6. In a situation, for example, the first transmitting-receiving device 8 and the second transmitting-receiving device 9 may be in an illuminated environment, and wavelengths of the illumination may coincide with the wavelengths of the first and second pulse light beams. In this case, the illumination may become a noise light, and SN ratios (signal/noise ratios) of the first pulse output signal 25 and the second pulse output signal 26 may be deteriorated. In this case, the wavelengths of the first and second pulse light beams are changed to wavelengths different from the wavelength of the illumination which may become noise light, and the wavelengths of the first and second pulse light beams are selectively detected by the first detector 12 and the second detector 13. Thus, the first pulse output signal 25 and the second pulse output signal 26 with enhanced SN ratios are obtained.

As described above, even when the wavelengths of the first and second pulse light beams coincide with the wavelength of the noise light, the first pulse output signal 25 and the second pulse output signal 26 with enhanced SN ratios are obtained by changing the wavelengths of the first and second pulse light beams to become different from the wavelength of the noise light.

A different operation of the second embodiment of the torsional vibration measuring instrument is now described referring to FIG. 6. In a case, the first transmitting-receiving device 8 and the second transmitting-receiving device 9 may be in an illuminated environment, and it may be difficult to change the wavelengths of the first and second pulse light beams to become different from the wavelengths of the illumination. In this case, the SN ratios of the first pulse output signal 25 and the second pulse output signal 26 may be deteriorated. In this case, the first and second reflected pulse light beams are selected by wavelengths and are detected by the first detector 12 and the second detector 13. Thus, the noise lights with wavelengths different from the wavelengths of the first and second reflected pulse light beams are eliminated, and the first pulse output signal 25 and the second pulse output signal 26 with enhanced SN ratios are obtained.

As described above, even when it is difficult to change the wavelengths of the first and second pulse light beams as to become different from the wavelengths of the noise light, the first and second reflected pulse light beams can be selected by wavelengths to remove the noise, and can be detected by the first detector 12 and the second detector 13. Thus, the first pulse output signal 25 and the second pulse output signal 26 with enhanced SN ratios are obtained.

A different operation of the second embodiment of the torsional vibration measuring instrument is now described. In a case, the reflection rate of the reflector regions of first multiplex reflector plate 23 and the second multiplex reflector plate 24 may deteriorate, and the SN ratio of the first pulse output signal 25 and the second pulse output signal 26 may deteriorate. Such a case may be caused by damage, degradation, deterioration or adhesion of substance on the reflector surfaces. Such a case would likely occur more often and more severely as the devices are aged.

Therefore, when the first pulse light beam, which is irradiated from the first transmitting-receiving device 8, hit the first multiplex reflector plate 23, the first reflected pulse light beam becomes weak in optical power. However, when the region outside of the reflector regions on the first multiplex reflector plate 23 is irradiated, the pulse light beam is not detected by the first detector 12, since the region outside of the reflector regions has a small regular reflectance. Thus, the first pulse output signal 25 is obtained, although the amplitudes of the constituting pulse elements are smaller, because the pulse light beam is not detected at the region outside of the reflector regions on the first multiplex reflector plate 23.

Likewise, the second pulse output signal 26 with high SN ratio can be obtained with very small noise, although the amplitudes of the pulses become smaller.

Thus, the first and second pulse light beams scatter to the directions other than the normal reflection directions (or are absorbed) on the low-reflection regions (or scattering regions or absorption regions), even when the reflection ratio of the reflector regions in the first multiplex reflector plate 23 and the second multiplex reflector plate 24 deteriorates. Therefore, the first pulse output signal 25 and the second pulse output signal 26 having a high SN ratio with very small noise relative to the amplitude can be obtained, although the amplitudes of the pulses may become smaller.

A different operation of the second embodiment of the torsional vibration measuring instrument is now described referring to FIG. 7. In a case, the frequency of torsional vibration of the rotator 5 may be higher than the rotation frequency fm/2 [Hz] of the rotator 5.

In such a case, the signal processing unit 14 sets a threshold voltage value of $V_{th}$ [V] to the rising pulse for the first pulse output signal from the j-th reflector region ($1 \leq j \leq m$), as shown in FIG. 7. The trigger time $tr_{j+(u-1)k,i}$ [s] of the i-th reflected pulse light in the first pulse output signal from the {j+(u−1)k}-th reflector region is measured. Then, the trigger time $tr_{j+uk,i}$ [s] of the corresponding i-th reflected pulse light from the (j+uk)-th reflector region ($1 \leq k \leq m$) is measured. Likewise, $tr_{j+uk,i}$ and $tr_{j+(u-1)k,i}$ are measured for each i. Then, the rotational period $T_1$ [s] of the first pulse output signal 25 is obtained based upon Formula (7):

$$T_1 = (m/k)\Sigma(tr_{j+uk,i} - tr_{j+(u-1)k,i})/n \qquad (7)$$

where k is the number of the reflectors to be measured. The "m/k" is an inverse number of the ratio of distance between the {j+(u−1)k}-th and the (j+uk)-th reflector regions to the peripheral length around the rotator 5. If the distances between the reflector regions are not even, m/k is obtained based upon the actual distance between the {j+(u−1)k}-th and the (j+uk)-th reflector regions.

Likewise, the rotational period $T_2$ [s] of the second pulse output signal 26 is obtained. Then, the time difference $T_t$ [s] of rotational periods for each "u" is obtained based upon Formula (4), and then, the torsional vibration frequency $f_t$ [Hz] can be obtained by frequency analysis.

As described above, even when the torsional vibration frequency of the rotator 5 is higher than the rotation frequency fm/2 [Hz] of the rotator 5, the torsional vibration frequency $f_t$ [Hz] can be obtained precisely, by using the {j+(u−1)k}-th and the (j+uk)-th reflector regions, by obtaining rotational periods $T_1$ [s] and $T_2$ [s], by obtaining the time difference $T_t$ [s] of the rotational periods based upon Formula (4) with time, and by frequency analysis.

In the first and second embodiments described above (FIGS. 1 and 6), the optical fibers 3a and 4a which constitute parts of the first and second transmission means 3 and 4, respectively, are used both as transmission means and receiving means. As alternative examples, the optical fibers 3a and 4a each may include separate transmission means and receiving means.

Furthermore, in the first and second embodiments described above, the first and second pulse light irradiation devices 1 and 2, or 61 and 62, respectively, are separate devices. As alternative examples, a single pulse light irradiation device may be used both for the first and second pulse light irradiation devices by utilizing a light splitter for splitting the pulse light.

Now, a third embodiment of the torsional vibration instrument according to the present invention is described referring to FIGS. 8 through 12. Here, parts that are common to those in the first or second embodiments are given common symbols and repetitive description is eliminated.

Figure 8:
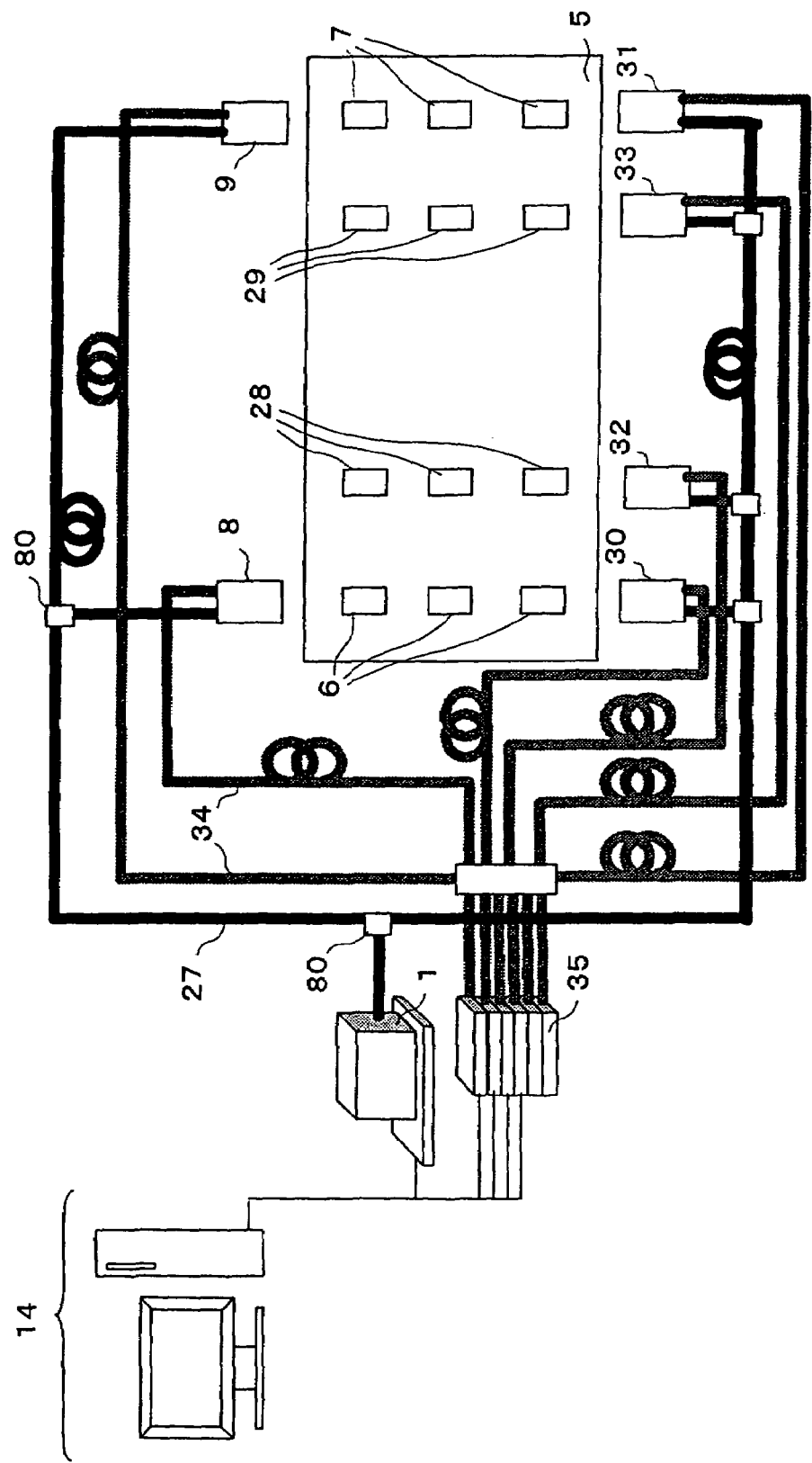
FIG. 8 is a schematic diagram showing a construction of a third embodiment of a torsional vibration measuring instrument according to the present invention.

As shown in FIG. 8, the torsional vibration measuring instrument of this embodiment includes a first pulse light irradiation device 1 and a multiplex outgoing-transmission device 27 for transmitting the light. The multiplex outgoing-transmission device 27 has a wave splitter 80 for splitting the irradiated pulse light beam into first to sixth pulse light beams. The rotator 5 to be measured has first to fourth reflector plates 6, 7, 28 and 29, respectively, for reflecting the pulse light beams.

The torsional vibration measuring instrument also has first to sixth transmitting-receiving devices 8, 9, 30, 31, 32 and 33, respectively, for irradiating the first to sixth pulse light beams on the first to fourth reflector plates 6, 7, 28 and 29, respectively. The torsional vibration measuring instrument also has a multiplex incoming-transmission device 34 for transmitting the first to sixth reflected pulse light beams separately. The torsional vibration measuring instrument also has a multiplex detector 35, which has first to sixth detectors. The torsional vibration measuring instrument also has a signal processing unit 14 for processing the first to sixth pulse output signals from the multiplex detector 35 and for calculating torsional vibration frequency of the rotator 5.

The multiplex outgoing-transmission device 27 has optical fibers or in-space transmission paths, and a wave splitters 80 for dividing the pulse light beams. The wave splitters 80 include elements for dividing light beams, such as prisms, mirrors and beam splitters. Although the wave splitters 80 in the present embodiment each have a single inlet and two outlets, the wave splitters may have any number of inlets and outlets. For example, if a wave splitter having a single inlet and six outlets is used, a single light beam can be divided into six beams at once.

The first to the fourth reflector plates 6, 7, 28 and 29 each have m element plates aligned in circumferential direction around the rotator 5.

The distance along the circumference around the rotator 5 between the first transmitting-receiving device 8 and the third transmitting-receiving device 30 is arbitrary, and the number of the transmitting-receiving device elements to be attached is limitless. The case where m transmitting-receiving device elements are attached on the rotator 5 is equivalent in operation to the case where m reflector plates are attached. The second transmitting-receiving device 9 and the fourth transmitting-receiving device 31 are in similar situation.

Any number (more than one) of transmitting-receiving device elements may be attached at arbitrary axial locations of the rotator 5.

The multiplex incoming-transmission device 34 has a six-fiber bundle or a in-space transmission path, for example, so that the first to sixth reflected pulse light beams may be transmitted separately therethrough. The multiplex detector 35 includes first to sixth detectors for detecting the first to sixth reflected pulse light beams, respectively, separately.

The operation of the third embodiment of the torsional vibration measuring instrument described above is now discussed.

The pulse light beam irradiated from the first pulse light irradiation device 1 is transmitted through the multiplex outgoing-transmission device 27 and divided by the wave splitter 80. The divided light beams are transmitted to the first, second, third and fourth transmitting-receiving devices 8, 9, 30 and 31, respectively.

By the first transmitting-receiving device 8 and the third transmitting-receiving device 30, pulse light beams of diameter of Φ [m] are irradiated to the first reflector plates 6 attached on the rotator 5 to be measured. Then, the reflected pulse light beams are transmitted separately to the multiplex detector 35 by the multiplex incoming-transmission device 34 so that the light beams are detected by the detectors.

Figure 9:
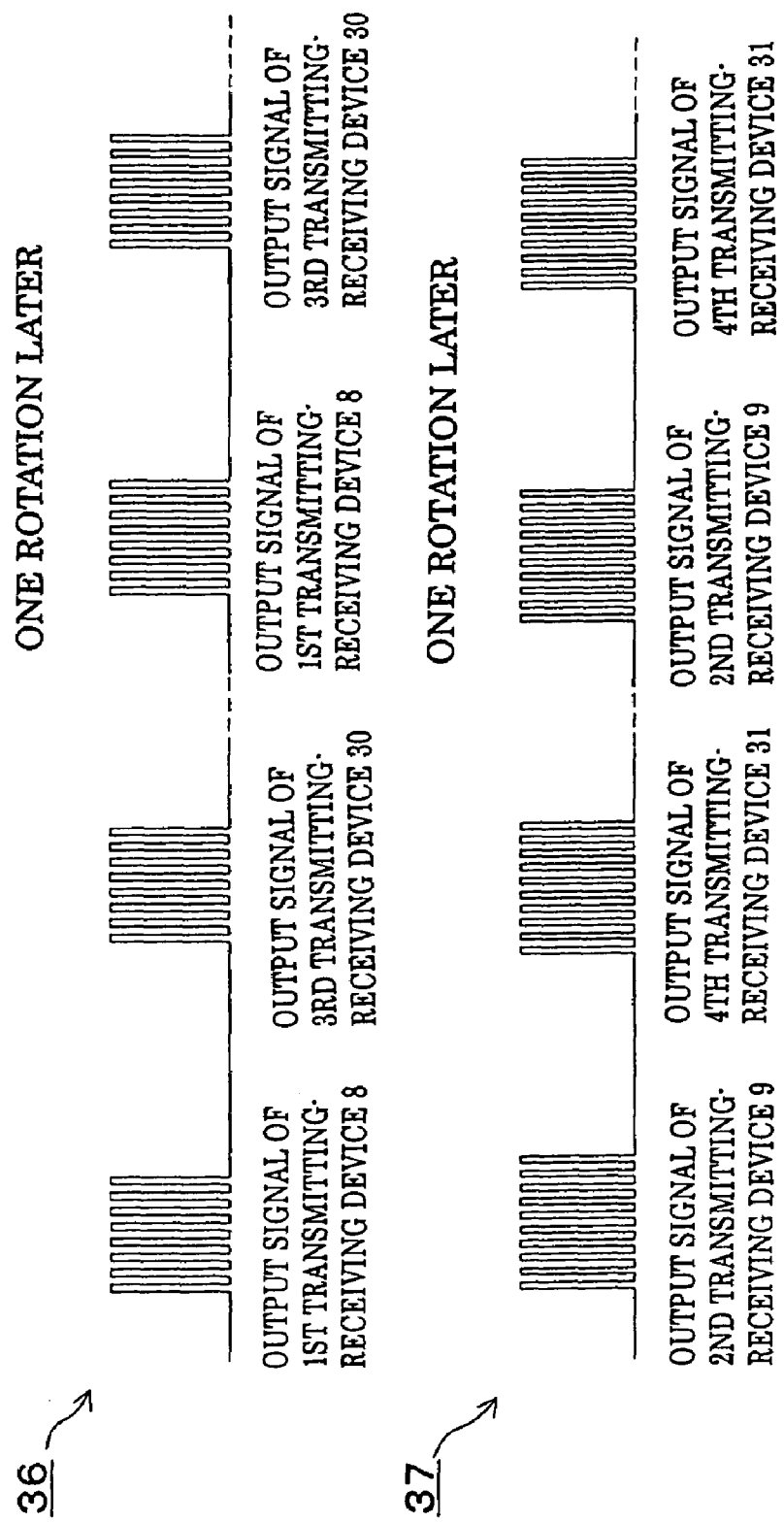
FIG. 9 is a chart showing the first and second pulse output signals of the third embodiment of the torsional vibration measuring instrument.

The signal processing unit 14 integrates the output signals from the first transmitting-receiving device 8 and the third transmitting-receiving device 30, and the output signals from the second transmitting-receiving device 8 and the fourth transmitting-receiving device 31. Thus, the output signals are detected as shown in FIG. 9. Those output signals are the same as the results which can be obtained by attaching the reflector plates of the same number of the transmitting-receiving devices. Then, when the transmitting-receiving devices are arranged with equal intervals along the periphery, m/k is calculated from the number of the attached transmitting-receiving devices m and the interval between the transmitting-receiving devices k. When the transmitting-receiving devices are arranged with non-equal intervals, m/k is obtained from the actual intervals of the transmitting-receiving devices. Then, the rotational period $T_1$ [s] and $T_2$ [s] are obtained for each u based upon Formula (7). Then, the time difference $T_t$ [s] of rotational periods are obtained based upon Formula (4), and then, the torsional vibration frequency $f_t$ [Hz] can be obtained by frequency analysis.

As described above, by attaching m transmitting-receiving devices along the periphery of the rotator 5 to be measured, the same effect is obtained as the case of m reflector plates. Thus, torsional vibration frequency $f_t$ [Hz] can be precisely measured.

A different operation of the third embodiment of the torsional vibration measuring instrument is now described.

The pulse light beam irradiated from the first pulse light irradiation device 1 is transmitted by the multiplex outgoing-transmission device 27 and is divided by the wave splitter 80. The pulse light beam is further transmitted to the third through the sixth transmitting-receiving devices 30 through 33. The third transmitting-receiving device 30 irradiates pulse light beam to the first reflector plate 6, the fourth transmitting-receiving device 31 irradiates pulse light beam to the second reflector plate 7, the fifth transmitting-receiving device 32 irradiates pulse light beam to the third reflector plate 8, and the sixth transmitting-receiving device 33 irradiates pulse light beam to the fourth reflector plate 9. The reflected pulse light beams are separately transmitted to the multiplex detector 35 by the multiplex incoming-transmission device 34, and each is detected by each of the detectors. The output signals of the multiplex detector 35 are transmitted to the signal processing unit 14.

Figure 10:
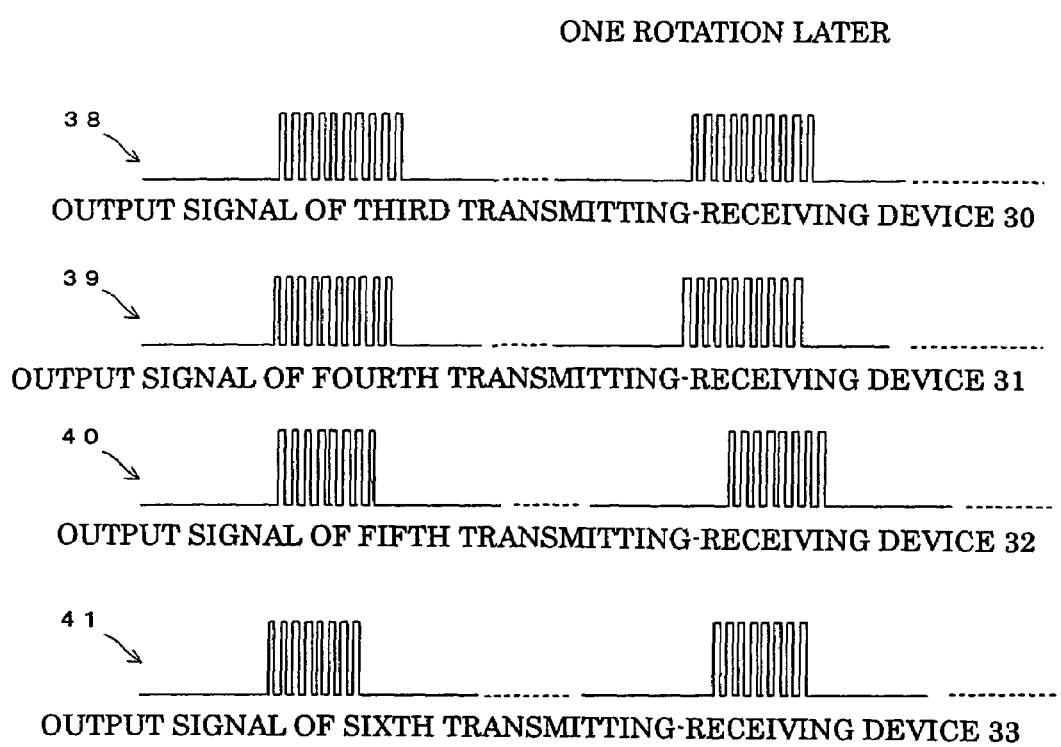
FIG. 10 is a chart showing the third to sixth pulse output signals of the third embodiment of the torsional vibration measuring instrument.

As shown in FIG. 10, the signal processing unit 14 detects the third pulse output signal 38 from the third transmitting-receiving device 30, the fourth pulse output signal 39 from the fourth transmitting-receiving device 31, the fifth pulse output signal 40 from the fifth transmitting-receiving device 32, and the sixth pulse output signal 41 from the sixth transmitting-receiving device 33. Then, the rotational periods $T_3$ [s], $T_4$ [s], $T_5$ [s] and $T_6$ [s] are obtained for each u based upon the output signals. Then, the time difference $T_t$ [s] of rotational periods are obtained for each couple of the rotational periods, based upon Formula (4). Then, the torsional vibration frequency $f_t$ [Hz] for a plurality of points along the axis can be obtained by frequency analysis. The measurement precision can be enhanced by averaging the obtained plurality of values of the torsional vibration frequency $f_t$ [Hz].

Although the embodiment shown here has four transmitting-receiving devices, torsional vibration frequencies $f_t$ [Hz] at more points can be measured with more transmitting-receiving devices.

As described above, the torsional vibration frequencies $f_t$ [Hz] at a plurality points along the axis can be measured with three or more transmitting-receiving devices attached on the rotator 5 to be measured. Then, accurate measurement is realized by averaging.

FIG. 8 shows an example where the multiplex outgoing-transmission device 27 and the multiplex incoming-transmission device 34 are transmitting path (ex. separate optical fibers). Alternatively, they may be integrated into a single multiplex transmission device.

According to the present invention, a torsional vibration measuring instrument is presented which can measure torsional vibration and rotational speed of a rotator with high precision even when the rotational axis of the rotator to be measured has an axial vibration.

The invention claimed is:

1. A torsional vibration measuring instrument comprising:
   a plurality of reflecting means arranged with stipulated intervals therebetween along surface of a rotator of which torsional vibration is to be measured;
   a pulse light irradiating means for irradiating a repetitive pulse light beam to the plurality of reflecting means;
   an outgoing-transmitting means for transmitting the irradiated pulse light beam;
   a plurality of transmitting-receiving means for irradiating the transmitted pulse light beam to the plurality of reflecting means, and for receiving plurality of reflected pulse light beams which have been reflected by the plurality of reflecting means;
   an incoming-transmitting means for transmitting the plurality of reflected pulse light beams which have been received;
   a plurality of detecting means for detecting the plurality of reflected pulse light beams which have been transmitted by the incoming-transmitting means; and
   a signal processing means for processing a plurality of pulse output signals which have been outputted from the plurality of detecting means and for calculating torsional vibration frequency of the rotator by averaging rotational periods through a number of pulse light beams which are irradiated to one of the reflecting means and are reflected at the one of the reflecting means during a time period when the one of the reflecting means passes in front of one of the transmitting-receiving means.

2. The torsional vibration measuring instrument of claim 1, wherein the pulse light beam irradiating means can irradiate pulse light beam with variable pulse repetitive frequency and with variable pulse time width.

3. The torsional vibration measuring instrument of claim 1, wherein the pulse light beam irradiating means includes a plurality of separated units each corresponding to one of the plurality of transmitting-receiving means.

4. The torsional vibration measuring instrument of claim 1, wherein the ongoing-transmitting means includes a beam splitter for splitting the pulse light irradiated from the pulse light irradiating means and for transmitting the pulse light.

5. The torsional vibration measuring instrument of claim 1, wherein the plurality of reflecting means and the plurality of transmitting-receiving means are aligned in radial direction of the rotator to be measured, and that the pulse light beams are directed so that the pulse light beam is irradiated substantially perpendicular to the plurality of reflector means.

6. The torsional vibration measuring instrument of claim 1, wherein the outgoing-transmission means and the incoming transmission means have at least one light dividing means, and that the outgoing-transmission means and the incoming transmission means utilize at least partly a common light guide.

7. The torsional vibration measuring instrument of claim 1, wherein the signal processing means calculate torsional vibration frequency of the rotator based upon difference of rotational periods obtained by the corresponding pulse output signals.

8. The torsional vibration measuring instrument of claim 1, wherein the transmitting-receiving means are arranged in peripheral direction of the rotator.

9. The torsional vibration measuring instrument of claim 1, wherein at least three transmitting-receiving means and at least three reflecting means are arranged along axial direction of the rotator.

10. The torsional vibration measuring instrument of claim 1, wherein the reflecting means has a high reflection region where the light beam is reflected with a high reflection coefficient, and a low reflection region where the light beam is reflected with a reflection coefficient lower than the high reflection coefficient, and that the high reflection region and the low reflection region are distributed along peripheral direction of the rotator.

11. The torsional vibration measuring instrument of claim 1, wherein the plurality of reflecting means each includes a plurality of units of reflecting means attached on the rotator.

12. The torsional vibration measuring instrument of claim 1, wherein the signal processing means calculates the torsional vibration frequency of the rotator to be measured, by differentiating the plurality of pulse output signals which are outputted from the plurality of detecting means.

13. The torsional vibration measuring instrument of claim 1, wherein the signal processing means calculates the torsional vibration frequency of the rotator to be measured, by digital counting of the plurality of pulse output signal which are outputted from the plurality of detecting means.

14. The torsional vibration measuring instrument of claim 1, wherein the signal processing means calculates the torsional vibration frequency of the rotator to be measured, using lengths of the plurality of reflecting means in peripheral direction.

15. The torsional vibration measuring instrument of claim 1, wherein wavelength of pulse light of the pulse irradiating means can be changed.

16. The torsional vibration measuring instrument of claim 1, wherein the detecting means include wavelength selecting means for selecting the reflected pulse light beam using the wavelength and for detecting the selected pulse light beam.

17. The torsional vibration measuring instrument of claim 1, wherein size of the pulse light beam which is irradiated to the reflecting means is much smaller than lengths of the reflecting means in axial and peripheral directions of the rotator.

18. A torsional vibration measuring instrument comprising:
a plurality of reflectors arranged with stipulated intervals therebetween along surface of a rotator of which torsional vibration is to be measured;
a pulse light irradiating source that irradiates a repetitive pulse light beam to the plurality of reflectors;
an outgoing-transmitting optical fiber that transmits the irradiating pulse light beam;
a plurality of transmitting-receiving devices for irradiating the transmitted pulse light beam to the plurality of reflectors, and for receiving plurality of reflected pulse light beams which have been reflected by the plurality of reflectors;
an incoming-transmitting optical fiber that transmits the plurality of reflected pulse light beams which have been received;
a plurality of detector that detect the plurality of reflected pulse light beams which have been transmitted by the incoming-transmitting optical fiber; and
a signal processor that processes a plurality of pulse output signals which have been outputted from the plurality of detectors and calculated torsional vibration frequency of the rotator by averaging rotational periods through a number of pulse light beams which are irradiated to one of the reflectors and are reflected at the one of the reflectors during a time period when the one of the reflectors passes in front of one of the transmitting-receiving devices.

* * * * *